Aug. 12, 1952     P. C. HUTTON     2,606,795
SELF-ALIGNING JOINT OR BEARING
Filed March 22, 1949
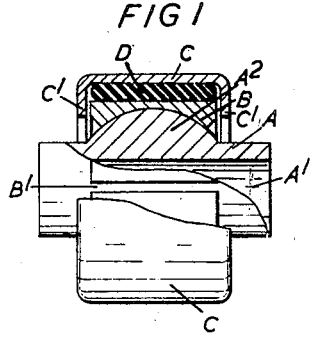
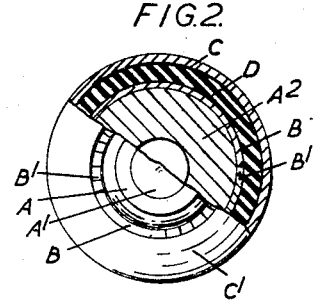
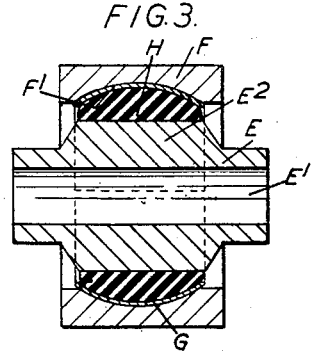
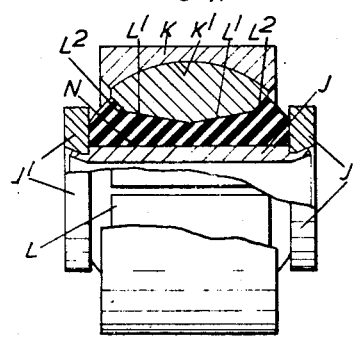
Inventor
Philip C. Hutton.
By
Harness, Dickey & Pierce.
Attorneys.

Patented Aug. 12, 1952

2,606,795

UNITED STATES PATENT OFFICE 2,606,795

SELF-ALIGNING JOINT OR BEARING

Philip Charles Hutton, London, England, assignor to Silentbloc Limited, London, England, a company of Great Britain Application March 22, 1949, Serial No. 82,798
In Great Britain March 23, 1948

8 Claims. (Cl. 308—72)

This invention relates to self-aligning joints or bearings of the kind comprising an outer member or socket and an inner member having an annular space between them in which is disposed an annular member of rubber or the like by which the inner and outer members are connected and which permits relative movement between them by reason of intermolecular distortion which can take place in the rubber or the like.

The object of the invention is to provide a self-aligning joint or bearing which will be particularly suited to the requirements of mechanisms in which, during normal operation, a limited degree of relative universal movement between the inner and outer members of the joint or bearing only is required, but from time to time, as when the mechanism is put out of operation or its setting is changed, the mean relative position of the inner and outer members is altered to a degree which brings it outside the range of normal relative movements.

A self-aligning joint or bearing according to the present invention comprises inner and outer members arranged one within the other with an annular space separating them, at least one of the surfaces bounding the annular space being of part spherical form, a split annular member having a part spherical surface engaging the part spherical surface constituting one of the surfaces bounding the annular space, and a bushing of rubber or like resilient material interposed and radially compressed between the other of the surfaces bounding the annular space and the adjacent surface of the split annular member to maintain the spherical surface of the split annular member in close frictional contact with the spherical surface with which it engages.

In one preferred arrangement the inner member has an annular part spherical outer surface, the outer member has a cylindrical inner surface and the split annular member which lies in the annular space between the inner and outer members, has a part spherical inner surface which engages the part spherical outer surface of the inner member and a cylindrical outer surface which is spaced from the inner surface of the outer member, the rubber or like bushing being thus interposed between cylindrical surfaces respectively on the split annular member and the outer member.

In other arrangements the arrangement may be such that one or each of the surfaces between which the rubber or like bushing lies is part spherical.

The invention may be carried into practice in various ways and a number of constructions according to the invention are illustrated by way of example in the accompanying drawings, in which, Figure 1 is a side elevation partly in section of one construction according to the invention, Figure 2 is an end elevation, also partly in section, of the construction shown in Figure 1, Figure 3 is a sectional side elevation of an alternative construction according to the invention, and Figure 4 is a similar view to Figure 1 of a still further construction according to the invention.

In the construction illustrated in Figures 1 and 2 the pivotal joint comprises an annular member A having a cylindrical bore $A^1$ through which can pass a closely fitting bolt or pin for securing the member A rigidly to one of the two parts to be connected by the joint, and a part-spherical external portion $A^2$ constituting in effect the ball of a ball and socket joint. Surrounding the ball part $A^2$ is an annular socket B which is split longitudinally as indicated at $B^1$. Surrounding the split socket B is an annular outer member or housing C spaced from the socket B by an annular space in which is disposed a radially compressed and axially elongated bushing of rubber or the like D which thus serves to connect the housing C to the socket B in a manner permitting relative oscillating movement between the housing and the socket about the axis of the latter and also a more limited degree of flexibility in other directions in a manner generally known per se. It will be seen that the rubber bushing D also presses the two parts of the split socket B into close contact with the ball part $A^2$ so as to provide a frictional grip between the socket B and ball part $A^2$ resisting relative movement between them. The housing C is provided with end flanges $C^1$ as shown.

It will be seen that oscillating movements between the part A and housing C within a certain range about the axis of the bore A will be taken up by intermolecular deformation of the rubber bushing D, the parts $A^2$ and B being held from relative movement by the friction between them. Similarly limited relative movement in other directions between the parts A and housing C can be taken up by deformation of the rubber only.

If and when the member A is rocked about the axis of the bore $A^1$ beyond a certain angle relatively to the housing C or beyond a different and smaller angle about some other axis, the ball part $A^2$ will slip within the split socket B, and having slipped into a new appropriate position, can again oscillate relatively to the housing C within the same limits as previously without slip and by reason only of intermolecular distortion of the rubber bushing D.

Thus the joint can be used with advantage in cases where normally there is a limited continuous oscillating movement between the part A and the housing C which is taken up wholly by the rubber bushing whereas on occasion some adjustment may be made which calls for greater relative movement between the parts A and C and causes the part $A^2$ to slip within the socket B into a new position whereupon the same degree of continuous oscillating movement can again take place without slip with the parts $A^2$ and B in the new relative position.

For example, the joint may be used with advantage in the operating mechanism of the reciprocating cutter bar of a reaping machine, in which case the normal oscillating movement is taken up entirely by intermolecular deformation of the rubber bushing D whereas when the apparatus is adjusted to alter the height or attitude of the cutting mechanism, the ball part $A^2$ can slip within the split socket B into the required new position and thereafter the oscillating movement will again be allowed for entirely by the intermolecular deformation of the bushing.

In assembling a joint as shown in Figures 1 and 2, the housing C is initially cylindrical, the rubber bushing is inserted into it, the assembly comprising the part A, $A^2$ and the surrounding split socket B is then forced into the bushing in a generally known manner preceded by a tapered mandrel or "leader" so as to compress the bushing radially and elongate it axially. The ends $C^1$ of the bushing C are then turned in.

It will be seen that these inturned ends $C^1$ limit relative longitudinal and rocking movement between the split socket B and the housing C and thereby ensure that for relative movement of the member A relatively to the housing C beyond a predetermined angle about an axis at right angles to that of the bore $A^1$ the split socket B will be caused to slip on the ball part $A^2$. In this way risk of overstressing of the bushing $A^2$ when there is a large degree of friction between the ball part $A^2$ and the socket B tends to be avoided.

In the alternative construction shown in Figure 3 the joint comprises an inner member E having a bore $E^1$ to receive a bolt or pin and a cylindrical external portion $E^2$. Surrounding the inner member E is an outer member or housing F having an annular part cylindrical inner surface $F^1$, spaced by an annular space from the surface of the part $E^2$. Engaging the surface $F^1$ is a split annular part spherical friction sleeve G, this sleeve being split longitudinally. Interposed between the sleeve G and the surface of the part $E^2$ is an annular bushing of rubber H having its radial dimensions so reduced between the parts G and $E^2$ that it adheres firmly to them.

It will be seen that with this arrangement the rubber will accommodate relative oscillation between the parts E and F within a certain range, the sleeve G being held stationary relatively to the part F by friction due to the pressure with which the rubber bushing presses it into contact with the surface $F^1$, while if the part E is rocked beyond a certain limit relatively to the part F the sleeve G will slip relatively to the part F and take up a new position relatively thereto in which position again limited relative oscillating movement can take place by intermolecular deformation of the rubber bushing only.

In the construction shown in Figure 4 the joint comprises an inner member J having a cylindrical bore to receive a bolt or pin and a cylindrical external surface, and an outer member or housing K having an annular part spherical inner surface $K^1$, and a longitudinally split socket L having a part spherical external surface engaging the surface $K^1$. The socket L has an inner surface of the contour shown comprising two inner frusto-conical sections $L^1$ and two outer frusto-conical portions $L^2$. Disposed in the annular space between the inner member J and the socket L is a bushing N of rubber which is radially compressed and axially elongated between these parts, while the inner member J is provided with end flanges $J^1$ against which the ends of the bushing bear.

In this arrangement normal comparatively small oscillating movements between the inner member J and the housing K are taken up in the rubber bushing while any larger movement will cause the member L to slip on the surface $K^1$ into a new position. The flanges $J^1$ and the frusto-conical form of the bore $L^1$, $L^2$ enables the joint to resist a considerable degree of axial load.

In assembling the construction shown in Figure 3, the bushing H may be inserted in the member G within the member F and the part E, $E^2$ then forced into the bore of the bushing, preceded by a tapered mandrel or leader.

In assembling the construction shown in Figure 4 the parts K, and L and the bushing N are assembled one within the other and the inner member J is then forced into the bushing, preceded by a tapered leader. Finally the flanges $J^1$ are applied to the ends of the member J and secured thereto by expanding the ends of the member J as shown.

In all the constructions described the bushing when in its free state may be cylindrical or may be shaped to conform somewhat to the shape of the space in which it is to be radially compressed.

What I claim as my invention and desire to secure by Letters Patent is:

1. A self-aligning joint or bearing including in combination inner and outer members arranged one within the other with an annular space separating them, at least one of the surfaces bounding the annular space being of part spherical form, a split annular member having a part spherical surface engaging the part spherical surface constituting one of the surfaces bounding the annular space, and a bushing of rubber or like resilient material interposed and radially compressed and axially elongated between the other of the surfaces bounding the annular space and the adjacent surface of the split annular member to maintain the spherical surface of the said annular member in close frictional contact with the spherical surface with which it engages, the inner surface of said rubber bushing and the surface with which it contacts being cylindrical for ease of assembly.

2. A self-aligning joint or bearing as claimed in claim 1, in which the split annular member is split longitudinally at at least one point in its circumference.

3. A self-aligning joint or bearing including in combination an inner member having an annular part-spherical outer surface, an outer annular member having a cylindrical inner surface and surrounding the inner member and spaced therefrom by an annular space, a split annular intermediate member having a part spherical annular inner surface which engages the part spherical surface of the inner member and a cylindrical outer surface which is spaced from the inner surface of the outer member, and an annular bushing of rubber or like resilient material interposed and radially compressed between the inner surface of the outer member and the outer surface of the split annular member so as to adhere to them and to maintain the spherical surface of the split annular member in close frictional contact with the spherical surface of the inner member.

4. A self-aligning joint or bearing as claimed in claim 3 in which the split annular member is split longitudinally.

5. A self-aligning joint or bearing as claimed in claim 1 in which the inner and outer surfaces of the split annular member are part spherical and the inner surface is engaged by the rubber or like bushing.

6. A self-aligning joint or bearing as claimed in claim 5 in which the part spherical surface of the split annular member lies in contact with a part spherical surface on the outer member and the surface of the inner member with which the rubber or like bushing engages is cylindrical.

7. A self-aligning joint or bearing as claimed in claim 1 in which the split annular member has a part spherical surface engaging a part spherical surface on the outer member, and the rubber or like bushing is interposed between the inner surface of the split annular member and the outer surface of the inner member and wherein the space between the inner member and the split annular member is formed with a double taper such that the ends of the space are of less mean diameter than its intermediate part.

8. A self-aligning joint or bearing as claimed in claim 7 in which the face of the split annular inner member has tapered surfaces at its ends against which end portions of the rubber or like bushing are adapted to bear during the assembling operation.

PHILIP CHARLES HUTTON.

REFERENCES CITED

The following references are of record in the file of this patent:

UNITED STATES PATENTS

| Number | Name | Date |
|---|---|---|
| 1,871,861 | Rossman | Aug. 16, 1932 |
| 1,911,866 | Wylie | May 30, 1933 |
| 1,989,116 | Strauss | Jan. 29, 1935 |

FOREIGN PATENTS

| Number | Country | Date |
|---|---|---|
| 558,476 | Great Britain | Jan. 6, 1944 |